2,831,901

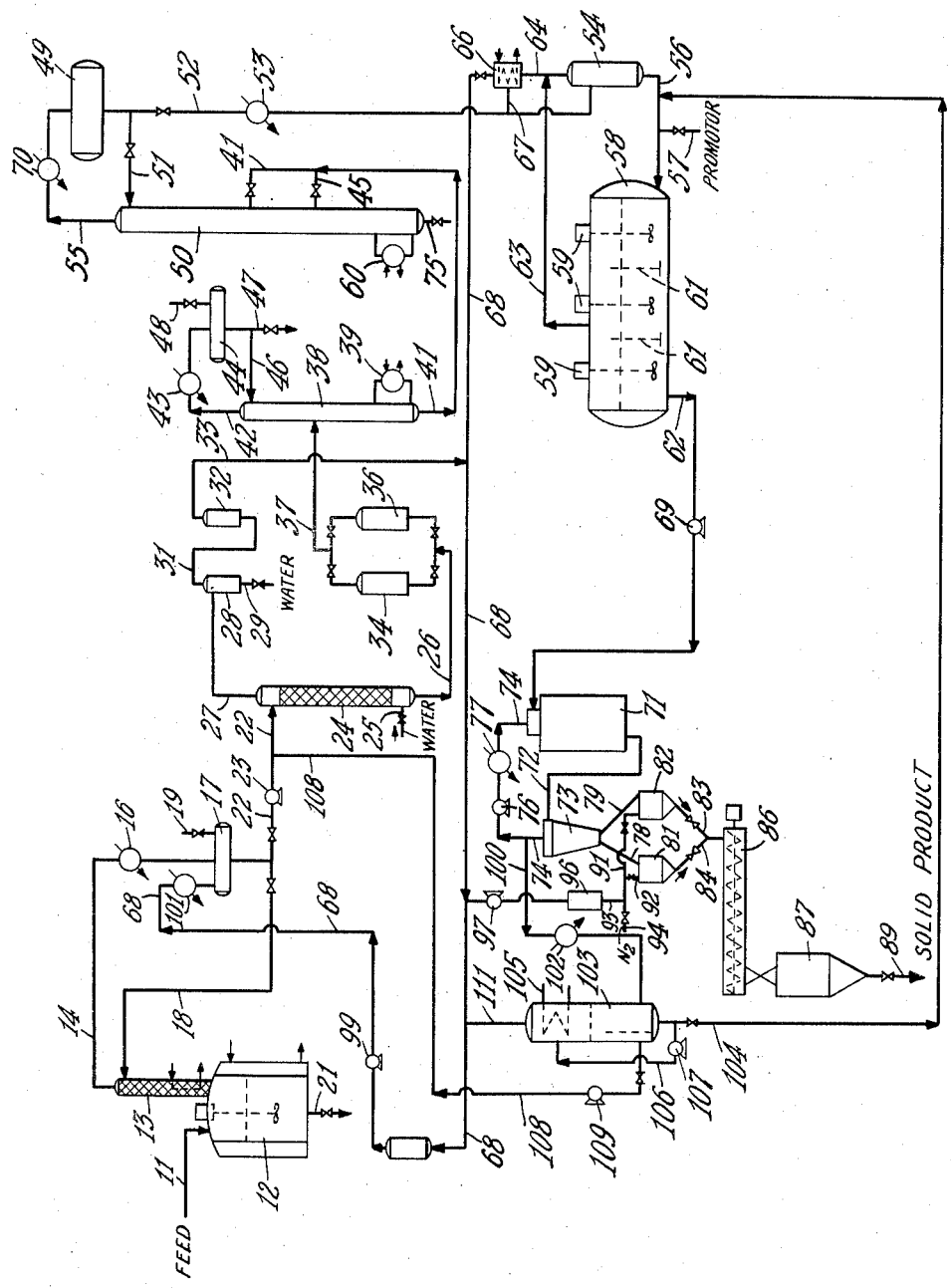

PROCESS FOR PURIFYING TRIFLUORO-CHLOROETHYLENE

John S. Rearick, Dover, N. J., and Robert P. Schaaf, East Orange, N. J., assignors, by mesne assignments, to Minnesota Mining and Manufacturing Company, St. Paul, Minn., a corporation of Delaware Original application September 13, 1952, Serial No. 309,434, now Patent No. 2,742,454, dated April 17, 1956. Divided and this application October 31, 1955, Serial No. 546,922

3 Claims. (Cl. 260—653)

This invention relates to a process for the manufacture of normally solid perhalogenated polymers. In one of its aspects this invention relates to a continuous method for the production of solid polymers of trifluorochloroethylene. In still another aspect this invention relates to the purification of monomer for the production of solid perhalogenated polymers.

Prior to the present invention trifluorochloroethylene has been polymerized and copolymerized in a batch type of operation. In the batch type of operation the monomer is introduced into a reaction bomb together with a suitable promoter and the temperature of the bomb is maintained at about $-16°$ C. or $-17°$ C. for a period of about seven days. In this time the monomer is polymerized to form a porous plug of solid polymer in the reaction bomb with approximately 30 to 50 percent yield of polymer based on monomer charged. The unreacted monomer is occluded in the interstices of the porous plug and is removed therefrom by heating the reaction bomb under subatmospheric pressure to evaporate unreacted monomer. The dried porous plug of polymer of trifluorochloroethylene is removed from the reaction vessel and broken into chips or granules for shipment in handling.

The bomb reactor is about 6 inches in diameter and is placed in a liquid cooling bath. Larger diameter bombs cannot be used because of the poor heat transfer of the monomer and solid polymer.

The bomb type of operation for the production of solid polymers of trifluorochloroethylene and other perhalogenated olefins has its inherent disadvantages. The apparatus and equipment is cumbersome with relatively low capacity. The accompanying labor costs are high. However, the yield of product based on monomer is high and the purity and physical characteristics of the resulting polymer are exceptionally good providing the monomer is adequately purified.

To overcome the low capacity and high labor costs for the polymerization of trifluorochloroethylene in the bomb type reactors, continuous slurry type methods have been proposed. In such previously proposed continuous process the monomer is produced by dechlorination of trifluorotrichloroethane by zinc in the presence of methanol. The crude monomer from the dechlorination still is then passed through a series of distillation columns to remove the high boiling contaminants of the crude monomer. Purified monomer is recovered from the overhead from the last distillation column. The distilled monomer is then contacted with an appropriate absorption medium to remove the last traces of methanol and any water that may be present. According to such continuous process, the monomer is then polymerized in an autoclave type of reaction vessel and a slurry of monomer and solid polymer is withdrawn from the autoclave and subjected to filtration to remove polymer from monomer and drying to remove the last traces of occluded monomer from the solid polymer.

Certain disadvantages have been found in the above proposed continuous process for the production of solid polytrifluorochloroethylene. In employing distillation to purify the monomer it was found substantially impossible to remove the last traces of the methanol because it formed an azeotrope with monomer. The methanol contamination of the monomer affected the chemical and physical characteristics of the ultimate polymer and results in a polymer of inferior characteristics. The presence of said contaminant also adversely affected the rate of polymerization and the yield of polymer therefrom. Handling of the polymerization mixture during polymerization presented a problem because of the high viscosity of the monomer-polymer slurry. The monomer-polymer slurry is very difficult to circulate in the polymerization zone and during subsequent recovery steps. The high viscosity of the monomer slurry was due primarily to the high absorption of monomer in the solid polymer. The recovery of solid polymer from monomer by filtration is also difficult because of the high absorption of monomer in solid polymer. It is, therefore, the purpose of this invention to overcome the above difficulties of both the bomb type of operation and previously proposed continuous type of operation as described above.

The object of this invention is to provide a continuous process for the polymerization of perhalogenated olefins to produce normally solid homopolymers and copolymers.

Another object of this invention is to provide a method for purifying monomer.

Another object of this invention is to provide a method for recovering dried solid polymer from a monomer slurry thereof.

There is still a further object of this invention to provide an integrated continuous process for the purification of monomer, polymerization of the monomer to produce a solid polymer and the recovery of monomer from solid polymer product.

A further object of this invention is to provide a process for large capacity production of normally solid polymers of trifluorochloroethylene, such as the thermoplastic polymer having an N. S. T. between about 240° C. and about 350° C.

Yet another object of this invention is to provide a continuous process for the polymerization of trifluorochloroethylene whereby the costs of production are substantially decreased.

Various other objects and advantages of the present invention will become apparent to those skilled in the art from the accompanying description and disclosure.

This invention applies generally to the polymerization of perhalogenated olefins to produce both solid homopolymers and copolymers. A perhalo olefin is defined as an olefin consisting of carbon and halogen with any degree of unsaturation; preferably according to this invention, the perhalo olefin contains fluorine, or chlorine, or both as the halogens. According to this invention a saturated fluorochloro carbon is dechlorinated under suitable conditions of dechlorination in the presence of a metallic dehalogenating agent to produce a perfluorohalo monoolefin as a monomer for subsequent polymerization. The dechlorination is carried out in the presence of a suitable solvent, such as methanol or ethanol. The crude monomer effluent containing both higher boiling and lower boiling contaminants is removed from the dechlorination reactor and purified. The major contaminants of the crude monomer are the solvent, such as methanol, and other perhalo olefins or perhalo paraffins. Accordingly, the crude monomer is water washed to effectively remove substantially all of the methanol or water soluble solvent. After water washing, the water washed monomer is then dried under conditions such that the monomer contains less than about 100 p. p. m., preferably less than 10 p. p. m. of water, and distilled to remove low boiling impurities. After removal of the low boiling impurities the monomer bottoms from the first distillation is subjected to a second distillation to remove the high boiling impurities. Best results are obtained by distillation at pressures above 100 pounds per square inch gage. Thereafter, the purified monomer is polymerized in a horizontal flow elongated reactor to form a slurry of solid polymer and monomer having a concentration not more than about 12 weight percent polymer in monomer. The polymerization is effected generally at a temperature between about 0° F. and about 60° F. or 70° F. under liquid phase conditions for a period of time between about 2 and about 40 hours. The slurry of polymer and monomer is then dried at an elevated temperature above about 150° F. to recover the polymer. The solid polymer is recovered as a product of the process. At least a portion of the recovered monomer is recycled to purification step to prevent the build up of impurities in the recycle.

The present invention is applicable to the homopolymerization of trifluorochloroethylene and to the copolymerization of trifluorochloroethylene with other halogenated fluorine containing olefins having no more hydrogen atoms than the number of carbon atoms. Such copolymerizations include the copolymerization of trifluorochloroethylene with tetrafluoroethylene, perfluoropropene, perfluorobutadiene, vinylidene fluoride, trifluoroethylene, monofluorochloroethylene, monofluorotrichloroethylene and difluorodichloropropene. In the copolymerization it is usually preferred to employ between about 5 and 95 weight percent of comonomer with trifluorochloroethylene. The conditions of polymerization of the copolymers of trifluorochloroethylene are substantially the same as for the homopolymerization of trifluorochloroethylene. The following discussion of the general application of the present invention to the polymerization of trifluorochloroethylene applies substantially to all copolymerization systems with trifluorochloroethylene.

For a better understanding of the present invention reference will be made to the accompanying drawing which diagrammatically illustrates a suitable arrangement of apparatus in elevation which is used for the production of normally solid plastic homopolymers and copolymers of trifluorochloroethylene. The principal pieces of apparatus for effecting the process depicted in the drawing comprise a dehalogenator 12, a water wash tower 24, distillation columns 38 and 43, polymerization reactor 58, spray dryer 71, cyclone separator 73 and concentrator 103. The process will be described in the drawing for the polymerization of trifluorochloroethylene to produce the homopolymer thereof. It will be understood that the quantities and other operating conditions referred to are for purposes of illustration and may be varied without departing from the scope of the invention.

According to the drawing and the process illustrated, trifluorotrichloroethane of the 1,2,2, chloro structure, which may be obtained commercially on the open market as Freon 11, is passed through conduit 11 to dehalogenator 12. A metallic dechlorinating agent, such as zinc dust, is introduced into dehalogenator 12 through means not shown. Although zinc is preferred various metal dechlorinating agents may be used, such as tin, manganese, magnesium and iron without departing from the scope of this invention. A suitable solvent or diluent is introduced into dehalogenator 12 through conduit 11. The preferred solvent is methanol. However, ethanol has also shown good results and there are various other conventional solvents for use in such a process. The mixture of trifluorotrichloroethane, solvent and zinc is vigorously agitated by conventional means, such as a stirrer, as shown. Dehalogenator 12 is maintained at a pressure of about 150 pounds per square inch gage and at a temperature of about 210° F. The temperature conditions are produced initially by steam in the jacket of the reactor. Once the reaction has been initiated it is self sustaining and cooling water is used in the jacket to control the reaction. Under these conditions Freon 113 is dechlorinated to trifluorochloroethylene which is passed overhead through dephlegmator 13 which removes a portion of entrained and vaporized methanol Freon 113 and other contaminants. The crude monomer is passed through conduit 14, condenser 16 to accumulator 17. The temperature of the material leaving dephlegmator 13 is approximately 110° F. and is reduced to a temperature of approximately 100° F. by conventional cooler 16. The pressure in accumulator 17 is approximately 150 pounds per square inch gage. A portion of condensate in accumulator 17 is recycled to dephlegmator 13 as reflux through conduit 18. Zinc chloride and the bottoms from the reaction in dehalogenator 12 may be removed therefrom through conduit 21. Conduit 19 is for the purpose of venting accumulator 17 to prevent the build up of pressure in the system.

Approximately 380 pounds per hour of monomer is passed from accumulator 17 through conduit 22 by means of pump 23 to the upper portion of water wash tower 24. Deaerated water is introduced into the bottom of tower 24 through conduit 25 at a rate of about 350 pounds per hour and countercurrently contacts downflowing liquid monomer. Washed liquid monomer substantially free from methanol is passed through conduit 26 to dryers 34 and 36 containing calcium sulfate. Dryers 34 and 36 may contain any conventional type of drying material, such as disclosed in Patent No. 2,600,804. The water wash is removed from the upper portion of tower 24 through conduit 27 and is passed to accumulator or separator 28. About 350 pounds per hour of water is removed from separator 28 through conduit 29. This water contains dissolved methanol. Any entrained or dissolved monomer is removed from the upper portion of accumulator 28 as vapor through conduit 31 and is passed to dryer 32 containing calcium sulfate. The dried monomer vapor is then recycled through conduit 33. The water washed and dried liquid monomer from the bottom of tower 24 is passed through conduit 37 to the intermediate portion of a distillation column 38. This monomer stream contains on an hourly basis approximately 691 pounds of monomer, 2.46 pounds of trifluoroethylene, 2.96 of difluorovinyl chloride and 2.58 pounds of trichloromonofluoromethane. In distillation column 38, separation is made between monomer and lower boiling impurities, such as trifluoroethylene together with minor amounts of other impurities. Conventional reboiler 39 maintains the bottom temperature of tower 38 at about 125° F. Liquid monomer substantially free from trifluoroethylene is removed from tower 38 through conduit 41. The vaporous overhead fraction from tower 38 containing monomer, trifluoroethylene and minor amounts of other light impurities is removed therefrom through conduit 42 and is passed through a conventional cooling means 43 to an accumulator 44. The temperature and pressure maintained in accumulator 44 is about 170 pounds per square inch gage and 80° F. Uncondensables may be vented through conduit 48, if necessary. Approximately 706 pounds of the overhead fraction is recycled as reflux from accumulator 44 to distillation tower 38 through conduit 46. Approximately 2.46 pounds per hour of trifluoroethylene and approximately 2.34 pounds per hour of monomer are recovered from accumulator 44 through conduit 47. The top temperature of distillation tower 38 is maintained at about 94° F.

The liquid monomer stream in conduit 41 is substantially free from trifluoroethylene and light impurities but contains difluorovinyl chloride, trichloromonofluoromethane and higher boiling impurities. This stream is passed through conduits 41 and/or 45 into the intermediate portion of a distillation tower 50. Element 60 is a reboiler which maintains a bottom temperature of about 125° F. in tower 50. A liquid bottoms fraction comprising about 4.66 pounds of monomer, about 2.96 pounds of difluorovinyl chloride, about 7.38 pounds of trichloromonofluoromethane per hour and minor amounts of heavy impurities is removed from tower 50 through conduit 75 for disposal or recovery.

A vaporous overhead fraction is removed from distillation tower 50 through conduit 55 and is passed through a conventional cooler 70 to an accumulator 49. Accumulator 49 is maintained at a pressure of about 160 pounds per square inch gage and at a temperature of about 120° F. A portion of the condensate is recycled through conduit 51 to the upper portion of distillation tower 50. This reflux stream amounts to about 7,966 pounds per hour of monomer. A stream of substantially pure monomer is passed through conduit 52 through a conventional cooler 53 to a feed accumulator 54. About 684 pounds per hour of monomer is passed through conduit 52 at 32° F. to accumulator 54. Accumulator 54 is maintained at a temperature of about 32° F. and a pressure of about 30 pounds per square inch gage. Liquid feed monomer is passed from accumulator 54 through conduit 56 to the lower portion of a horizontal polymerization chamber 58. A promoter, such as trichloroacetyl peroxide, is introduced as a solution of appropriate strength in trichloromonofluoromethane into feed conduit 56. About 7.6 pounds per hour of such solution is introduced through conduit 57.

Polymerization chamber 58 comprises a horizontal cylindrical chamber containing baffles 61 dividing the chamber into three sections. The monomer polymer slurry in chamber 58 is maintained in a state of agitation in each of the polymerization sections by conventional stirrers 59. The bottom of baffles 61 contains openings so that the monomer polymer mixture may flow horizontally from the entrance of chamber 58 to the exit thereof. The liquid level in chamber 58 is maintained just below the top of baffles 61. A monomer polymer slurry containing less than about 12 percent solid polymer, preferably about 5 to 7 percent polymer, is withdrawn from the other end of horizontal chamber 58 through conduit 62. Chamber 58 is maintained at a pressure of about 30 pounds per square inch gage and a temperature of about 32° F. Under these conditions monomer is vaporized due to heat evolved in the reaction and is removed from the open space at the top of chamber 58 through a conduit 63 and is passed through conduit 64 to a conventional condenser 66. From condenser 66 liquid monomer is recycled through conduits 67 and 52 to accumulator 54. Any monomer vapor evolved from accumulator 54 is also passed to condenser 66 through conduit 64. The amount of monomer recycled through conduits 63 and 64 is about 2,030 pounds per hour at 32° F. The vaporization of this monomer in accumulator 54 and chamber 58 maintains the temperature of polymerization in chamber 58, and the heat of polymerization is removed by condenser 66. Uncondensed vapors are removed from the top of condenser 66 through conduit 68 and are recycled, as shown.

About 2,680 pounds per hour of liquid monomer and about 171 pounds per hour of solid polymer are passed through conduit 62 and pump 69 into spray dryer 71. The outlet temperature of spray dryer 71 is maintained at about 150° F. Vaporized monomer and suspended finely divided solid polymer are passed from spray dryer 71 through conduit 72 to cyclone separator 73. In cyclone separator 73 solid polymer is separated from vaporized monomer. Vaporized monomer is recycled to spray dryer 71 through conduit 74 through heater 77 by means of blower 76. Dried polymer is passed from cyclone separator 73 alternately through conduits 78 and 79 to lock hoppers 81 and 82, respectively. The lock hoppers are used alternately; when one lock hopper is filled, it is emptied by passing solid polymer through conduit 83 to screw conveyer 86 to storage hopper 87. Solid polymer product is recovered from storage hopper 87 through conduit 89 at a rate of about 171 pounds per hour. This material is passed through conventional extrusion apparatus for extruding the polymer for preparation for packing and shipping. While hopper 82 is being emptied hopper 81 is being filled and, vice versa, when hopper 81 is being emptied through conduit 84 hopper 82 is being filled.

Prior to emptying the hoppers 81 and 82, vaporized monomer is passed through conduits 91, 92 and 93 to dryer 96. Dryer 96 contains calcium sulfate or other conventional absorbing material to remove impurities so that the impurities will not corrode compressor 97 which is used to compress the monomer for introduction into conduit 68 for recycling. After emptying, lock hoppers 81 and 82 are repressured with nitrogen through conduit 94. The temperature of vaporous monomer from compressor 97 is about 300° F. Monomer is divided from conduit 74 and a portion passed through conduit 100 at about 150° F. through cooler 102, where the temperature is reduced to about 100° F., to monomer scrubber and concentrator 103. Vaporized monomer containing entrained finely divided polymer is introduced into the bottom of scrubber 103. About 2,680 pounds per hour of monomer is passed through conduit 100 to scrubber 103. Scrubber 103 contains a condensing or cooling element 105 in the top thereof to condense upwardly flowing monomer, which then flows as liquid to the bottom of scrubber 103. Scrubber 103 is maintained at a pressure of about 35 pounds per square inch gage and about 40° F. Liquid monomer is recycled by means of pump 107 through conduit 106 to the upper portion of scrubber 103 to scrub solids from the vaporous monomer. The liquid in the bottom of scrubber 103 contains finely divided polymer recovered in concentrated form and is recycled through conduit 104 to conduit 56 for return to polymerization vessel 58. The amount of monomer thus returned is approximately 2,167 pounds per hour through conduit 104. The temperature of this stream is about 32° F. About 320 pounds per hour of the liquid monomer in the bottom of scrubber 103 is passed through conduit 108 by means of pump 109 to conduit 22 for repurification. Vaporized monomer from scrubber 103 is passed to conduit 68. The vaporous monomer in conduit 68 is passed through absorber 98 containing calcium sulfate. This absorber is used to remove contaminants which might corrode subsequent compressor 99. From absorber 98, vaporous monomer is passed through conduit 68 by means of compressor 99 at a rate of about 193 pounds per hour and 140 pounds per square inch gage and at a temperature of 240° F. through cooler 101 to accumulator 17. Cooler 101 cools the monomer to about 100° F.

The conditions of operation of dehalogenator 12 and polymerization chamber 58, including the types of promoters and solvents, may be carried out in accordance with the teachings of Patent No. 2,600,804. Although different reaction conditions may be employed, such as temperature in chamber 58, if the reaction conditions are changed, the pressure and temperature conditions in the entire system is changed accordingly. Various modifications of the materials used and operating conditions may be employed without departing from the scope of this invention. However, the method of purification, type of polymerization zone and method of recovery of the product are essential features of the present invention and the integration of these features into a single unitary and continuous process is part of this invention.

Having described our invention, we claim:

1. A process for the purification of trifluorochloroethylene which comprises passing a distillate stream of trifluorochloroethylene containing as impurities trace amounts of methanol, trifluoroethylene, difluorovinyl chloride and trichloromonofluoromethane obtained by the dechlorination of trifluorotrichloroethane to a water scrubbing zone, water scrubbing said trifluorochloroethylene stream to remove methanol therefrom, passing a trifluorochloroethylene stream from said water scrubbing zone substantially free from methanol containing the other of said impurities and water to a drying zone, drying said water washed trifluoroethylene stream with calcium sulfate to remove water therefrom, passing a trifluorochloroethylene stream from said drying zone substantially free from water and containing trifluoroethylene, difluorovinylchloride, and trichloromonofluoromethane as impurities to a first distillation zone, removing an overhead fraction from said first distillation zone comprising trifluorochloroethylene and trifluoroethylene, removing a bottoms fraction from said first distillation zone comprising trifluorochloroethylene, difluorovinylchloride and trichloromonofluoromethane as impurities, passing said bottoms fraction to a second distillation zone, removing a bottoms fraction from said second distillation zone comprising trifluorochloroethylene, difluorovinylchloride and trichloromonofluoromethane therefrom, and removing an overhead fraction comprising trifluorochloroethylene from said second distillation zone substantially free from said impurities as the product of the process.

2. A process for purifying trifluorochloroethylene which comprises passing a distillate stream of trifluorochloroethylene containing as impurities trace amounts of methanol, trifluoroethylene, difluorovinylchloride and trichloromonofluoromethane obtained by the dechlorination of trifluorotrichloroethane in the presence of methanol and a metal dechlorinating agent to a water scrubbing zone, water scrubbing said stream of trifluorochloroethylene to remove methanol therefrom, passing a trifluorochloroethylene stream from said water scrubbing zone substantially free from methanol and containing the other of said impurities and water to a drying zone, drying said water washed trifluorochloroethylene stream to remove water therefrom, passing a trifluorochloroethylene stream from said drying zone substantially free from water and containing trifluoroethylene, difluorovinylchloride, and trichloromonofluoromethane as impurities to a first distillation zone, removing a high boiling fraction from said first distillation zone comprising trifluorochloroethylene and difluorovinylchloride and trichloromonofluoromethane as impurities and substantially free from trifluoroethylene, passing said high boiling fraction from said first distillation zone to a second distillation zone, and removing a low boiling fraction from said second distillation zone comprising trifluorochloroethylene and substantially free from said impurities as a product of the process.

3. A process for purifying trifluorochloroethylene which comprises passing a distillate stream of trifluorochloroethylene containing as impurities trace amounts of water soluble alcohol, trifluoroethylene, difluorovinylchloride and trichloromonofluoromethane, water scrubbing said trifluorochloroethylene stream to remove said water soluble alcohol therefrom, passing a trifluorochloroethylene stream from said water scrubbing zone substantially free from said water soluble alcohol and containing the other of said impurities and water to a drying zone, drying said water washed trifluorochloroethylene stream to remove water therefrom, passing a trifluorochloroethylene stream from said drying zone substantially free from water and containing trifluoroethylene, difluorovinylchloride, and trichloromonofluoromethane as impurities to a first distillation zone, removing a high boiling fraction from said first distillation zone comprising trifluorochloroethylene, and difluorovinylchloride and trichloromonofluoromethane as impurities and substantially free from trifluoroethylene, passing said high boiling fraction from said first distillation zone to a second distillation zone and removing a low boiling fraction from said second distillation zone comprising trifluorochloroethylene and substantially free from said impurities as a product of the process.

References Cited in the file of this patent

UNITED STATES PATENTS

| | | |
|---|---|---|
| 2,120,668 | Hanson | June 14, 1938 |
| 2,543,478 | Tooke et al. | Feb. 27, 1951 |
| 2,558,624 | Murray | June 26, 1951 |
| 2,560,838 | Ornold | July 17, 1951 |
| 2,589,212 | Ogapetus et al. | Mar. 18, 1952 |
| 2,606,937 | Colfee et al. | Aug. 12, 1952 |
| 2,614,129 | McBee et al. | Oct. 14, 1952 |